United States Patent
Lee

[15] 3,681,463
[45] Aug. 1, 1972

[54] ALKANE HYDROXY AMINES AND THE METHOD OF PREPARING THE SAME

[72] Inventor: Richard J. Lee, Park Forest, Ill.

[73] Assignee: Standard Oil Company, Chicago, Ill.

[22] Filed: Sept. 8, 1969

[21] Appl. No.: 856,172

[52] U.S. Cl..............260/584 R, 44/72, 252/51.5 A, 260/583 M
[51] Int. Cl................................................C07c 93/02
[58] Field of Search.....................260/583 M, 584 R

[56] References Cited

UNITED STATES PATENTS 3,255,248   6/1966   Suessenguth et al..........260/583
3,328,465   6/1967   Spiegler........................260/583

OTHER PUBLICATIONS

Sidgwick, The Organic Chemistry of Nitrogen, Millar et al. Ed., Clarendon Press: Oxford, 1966, pages 84–87.

Smith, The Chemistry of Open–Chain Organic Nitrogen Compounds, W. A. Benjamin, Inc.: New York, 1966, page 469.

*Primary Examiner*—Joseph Rebold
*Assistant Examiner*—C. F. Warren
*Attorney*—Arthur G. Gilkes, William T. McClain and Edwin C. Lehner

[57] ABSTRACT

Oil-soluble alkane hydroxy amine derivatives of alkenes containing at least ten carbon atoms, particularly low molecular weight unsaturated polymers of propene and butene, are useful as chemical intermediates and as additives in petroleum products. The amine derivatives are produced by nitrating the alkene with nitrogen tetraoxide under non-oxidizing conditions to form the corresponding nitro-nitrito alkane and reducing the nitro-nitrito alkane with hydrogen in the presence of a metallic hydrogenation catalyst.

1 Claim, No Drawings

ALKANE HYDROXY AMINES AND THE METHOD OF PREPARING THE SAME

BACKGROUND OF THE INVENTION

It is known that the nitration of olefins, containing at least ten carbon atoms, with nitrogen tetraoxide under non-oxidizing conditions forms the corresponding nitro-nitrito alkanes. While it is known to reduce relatively small carbon aliphatic nitro groups to amines, the reduction of a nitro group on an alkane group of relatively long carbon length, e.g., at least about 10 carbon atoms, adjacent to a nitrito group is not known. I have discovered that nitro-nitrito alkanes, having at least ten carbon atoms, can be catalytically reduced to the corresponding alkane hydroxy amines by treatment with hydrogen.

SUMMARY OF THE INVENTION

In accordance with the herein described invention, alkane hydroxy amines, in which the alkane group contains at least 10 carbon atoms, are obtained by catalytically reducing with hydrogen, as hereinafter described, nitro-nitrito alkanes having at least 10 carbon atoms.

a. Preparation of the nitro-nitrito alkane

The nitration of the alkene, to form the nitro-nitrito alkane, is effected by treating the alkene, containing at least 10 carbon atoms, under non-oxidizing conditions with nitrogen tetraoxide in an inert carrier gas, such as, for example, carbon dioxide or nitrogen, at a temperature of from about 100°F. to about 250°F. until absorption of the nitrogen tetraoxide ceases. The amount of nitrogen tetraoxide used will be about 1 mole per mol of unsaturation in the alkene. The nitration is preferably conducted in an inert solvent, such as, for example, an aliphatic or aromatic hydrocarbon solvent.

Any alkene, containing at least 10 carbon atoms, and at least one ethylenically unsaturated site, can be nitrated as above described. Mono- and polyalkenes, i.e., olefins, can be suitably so nitrated to the corresponding nitro-nitrito alkanes. Particularly suitable olefins are polymers of $C_2$ to $C_4$ mono-olefins containing at least about 20 carbon atoms, preferably from about 30 to about 200, or more, carbon atoms, and molecular weights in the range of from about 300 to about 100,000. A particularly useful class of nitro-nitrito alkanes are those prepared from polypropenes and polybutenes having average molecular weights in the range of from about 300 to about 2,500.

b. Reduction of the nitro-nitrito alkane

Reduction of the nitro-nitrito alkane is accomplished, in accordance with the present invention, by subjecting such alkane to treatment with hydrogen at a pressure in the range of from about atmospheric to about 5,000 pounds per square inch, in the presence of a reducing catalyst such as, for example, platinum, nickel, cobalt, etc. Any metal which will catalyze hydrogenation can be used as a catalyst for the herein described reduction. Temperatures in the range of from about 100°F. to about 600°F., preferably from about 250°F. to about 500°F., are employed, and the reductions are desirably carried out in the presence of an inert solvent. Suitable inert solvents are, for example, hydrocarbon solvents such as hexane, cyclohexane, pentane, benzene, and the like. The treatment with hydrogen is continued for a time sufficient to reduce substantially quantitatively the nitro-nitrito alkane to the corresponding hydroxy amine.

The resultant reduced product is desirably washed with non-reactive polar solvents, for example, acetone and/or alcohol, such as methyl alcohol, and the product filtered by suitable well known means. The filtrate is then freed, for example by evaporation or distillation, of any hydrocarbon solvent, if used during the reduction reaction.

The resultant alkane hydroxy amines find application for many uses. The oil-soluble products are suitable as additives in oleaginous compositions to impart detergency properties thereto; the products are also suitable as intermediates.

PREFERRED EMBODIMENTS OF THE INVENTION

The following examples are illustrative of preferred embodiments of the present invention.

In the following Examples A, B, and C, the nitro-nitrito alkane is prepared as follows: A viscous liquid polybutene having an average molecular weight of about 890 is dissolved in heptane, and nitrogen tetraoxide, in a carrier carbon dioxide gas, introduced at the rate of about 2 cubic feet per hour at reflux temperature or below, suitably about 170°F., for a period of 16 hours. The resultant nitration product is the corresponding nitro-nitrito polybutane.

EXAMPLE A

Three hundred grams of the above nitro-nitrito polybutane was reduced by treatment with hydrogen at a temperature of 400°F. and a pressure of 1,200 pounds per square inch in the presence of one gram of platinum catalyst (Adam's Catalyst). The resultant reduced product was the corresponding polybutane hydroxy amine.

EXAMPLE B

Five hundred grams of the above nitro-nitrito polybutane was reduced almost quantitatively to the corresponding hydroxy amine by hydrogen reduction under the same conditions of Example A, supra, in the presence of 10 grams of Raney nickel catalyst.

EXAMPLE C

Five hundred grams of the above nitro-nitrito polybutane were partially reduced by treatment with hydrogen for a period of 6 hours at a temperature of 400°F. and a pressure of 1,300 pounds per square inch in the presence of 30 percent cobalt on pumice catalyst; a yield of 60–80 percent of the poly-butane hydroxy amine was obtained. Conducting the reduction for a longer period (12 hours) substantially complete reduction of the nitro groups was achieved.

EXAMPLE D

The nitro-nitrito alkane, used in this example was a nitro-nitrito polypropane of about 800 molecular weight, prepared by nitrating a polypropene of about 800 molecular weight with nitrogen tetraoxide in the same manner as was the polybutene nitrated, as above described.

Seven hundred forty grams of the nitro-nitrito polypropane was reduced by treatment with hydrogen at a temperature of 320°F. and a pressure of 1,200 pounds per square inch in the presence of 10 grams of Raney nickel catalyst. The resultant reduced product was the corresponding polypropane hydroxy amine.

The detergency property of the herein described alkane hydroxy amines is demonstrated by the so-called Spot Dispersancy Test. This test is conducted by dissolving 1 gram of alkane hydroxy amine in 9 grams of "sludge oil." The mixture is heated in a constant temperature oven at 300°F. for 3 hours. Five drops of the hot oil mixture are placed on blotter paper, and the "spots" are allowed to develop at room temperature. After a three hour development period the areas of the oil-spot and the central sludge spot are measured. The ratio of the two areas is recorded as percent dispersancy. Sludge oil without additives is used as a blank for reference.

A polybutane hydroxy amine in which the polybutane had a molecular weight of about 890 (Sample A), and a polypropane hydroxy amine in which the polypropane was a polypropane of about 800 molecular weight (Sample B) were subjected to the above test; a sludge oil containing no dispersant (Sample C) was used as a control. The results obtained are shown below:

| Sample | Rating |
|--------|--------|
| A      | 56     |
| B      | 55     |
| C      | 45     |

The above data demonstrate that the herein described alkane hydroxy amines possess dispersancy qualities.

The herein described oil-soluble alkane hydroxy amines, prepared in accordance with the method herein described, are useable in hydrocarbon liquid fuels, and in oleaginous lubricant compositions in amounts of from about 0.01 percent to about 10 percent; the amount used in fuel compositions usually ranges from about 0.01 percent to about 1.0 percent, and in lubricant compositions from about 0.1 percent to about 10 percent.

Suitable oleaginous lubricating base materials are hydrocarbon oils, e.g., petroleum oils, synthetic lubricating oils such as those obtained by the polymerization of hydrocarbons, and other well known synthetic lubricating oils.

Concentrates of a suitable oil base containing more than 10 percent, e.g., from about 15 percent to about 50 percent or more, of the oil-soluble alkane hydroxy amines herein described, alone or in combination with other additives, can be used for blending with lubricating oils in proportions desired for particular conditions or use to give a finished product containing from about 0.1 percent to about 10 percent of such oil-soluble alkane hydroxy amines.

Percentages given herein and in the appended claims are weight percentages unless otherwise stated.

While particular preferred embodiments of this invention have been described, it is to be understood that the invention is not limited thereto, but includes such modifications and variations as come within the spirit and scope of the appended claims.

I claim:

1. The oil-soluble alkane hydroxy amine derivative of an alkene polymer selected from the group consisting of polypropene having an average molecular weight of about 800 and polybutene having an average molecular weight of about 890, said amine derivative being the product of the process of (A) nitrating said alkene polymer with nitrogen tetraoxide under non-oxidizing conditions to form the corresponding nitro-nitrito alkane of said polymer by passing nitrogen tetroxide in an inert carrier gas into an inert hydrocarbon solution of said polymer, said solution being maintained under liquid phase reaction conditions and at a temperature of about 170°F, until absorption of nitrogen tetraoxide ceases; and (B) treating, under liquid phase reaction conditions, the nitro-nitrito alkane of step A in an inert hydrocarbon solvent with hydrogen in the presence of a metal hydrogenation catalyst at a temperature in the range of about 320°F to about 400°F and at a pressure in the range of from about 1,200 to about 1,300 pounds per square inch for a period of time sufficient to reduce substantially said nitro-nitrito alkane and form the corresponding alkane hydroxy amine.

* * * * *